United States Patent
Quast et al.

(10) Patent No.: US 10,076,997 B2
(45) Date of Patent: *Sep. 18, 2018

(54) SURROUND VIEW SYSTEM

(75) Inventors: Johannes Quast, Karlsruhe (DE);
Kay-Ulrich Scholl, Karlsbad (DE);
Bernd Gassmann,
Straubenhardt-Langenalb (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 756 days.

This patent is subject to a terminal disclaimer.

(21) Appl. No.: 13/563,408

(22) Filed: Jul. 31, 2012

(65) Prior Publication Data
US 2013/0033602 A1 Feb. 7, 2013

(30) Foreign Application Priority Data
Aug. 5, 2011 (EP) .................................... 11176707

(51) Int. Cl.
*H04N 9/47* (2006.01)
*B60R 1/00* (2006.01)

(52) U.S. Cl.
CPC .......... *B60R 1/00* (2013.01); *B60R 2300/105* (2013.01); *B60R 2300/303* (2013.01); *B60R 2300/602* (2013.01); *B60R 2300/607* (2013.01)

(58) Field of Classification Search
CPC ........ B60R 2300/303; B60R 2300/602; B60R 2300/607; B60R 2300/70; B60R 2300/80; B60R 2300/802–2300/8093
See application file for complete search history.

(56) References Cited

U.S. PATENT DOCUMENTS 6,476,812 B1* 11/2002 Yoshigahara ........... G06T 17/00
345/427
6,556,206 B1* 4/2003 Benson ................... G06T 15/20
345/427

(Continued)

FOREIGN PATENT DOCUMENTS

EP      1 302 365 A1    4/2003
EP      2 192 552 A1    6/2010

(Continued)

OTHER PUBLICATIONS

Chen, Y.Y. et al., "An Embedded System for Vehicle Surrounding Monitoring," 2009 $2^{nd}$ International Conference on Power Electronics and Intelligent Transportation System, *IEEE*, Piscataway, NJ, USA, dated Dec. 19, 2009, XP031624185, pp. 92-95.

(Continued)

*Primary Examiner* — Brian Yenke
*Assistant Examiner* — Humam Satti
(74) *Attorney, Agent, or Firm* — McCoy Russell LLP

(57) ABSTRACT

A system operable to generate a surround view based on image data, where the image data may include image data associated with surroundings of an object, such as a vehicle. The system may also be operable to project the surround view inversely onto a bowl-shaped projection surrounding the object. Further, the system may be operable to generate a virtual user view via a virtual camera position, where the virtual camera position is on a first horizontal ellipse that is about the bowl-shaped projection at a first height. Also, the system is operable to determine a viewing direction from the virtual camera position that points at a location on a second horizontal ellipse that is about the bowl-shaped projection at a second height. The second height may be lower than the first height and the second horizontal ellipse may be smaller than the first horizontal ellipse.

18 Claims, 11 Drawing Sheets

(56) References Cited

U.S. PATENT DOCUMENTS

| | | | |
|---|---|---|---|
| 7,161,616 B1* | 1/2007 | Okamoto | B60R 1/00 348/148 |
| 7,307,655 B1* | 12/2007 | Okamoto | G06K 9/00791 348/222.1 |
| 7,554,573 B2* | 6/2009 | Mizusawa | B60R 1/00 348/113 |
| 8,319,618 B2* | 11/2012 | Gomi | B60R 1/00 340/435 |
| 8,941,737 B2* | 1/2015 | Ozaki | B60R 1/00 348/148 |
| 2002/0027651 A1 | 3/2002 | Jackson et al. | |
| 2003/0021490 A1* | 1/2003 | Okamoto | B60R 1/00 382/284 |
| 2003/0095131 A1* | 5/2003 | Rondinelli | G06T 3/0062 345/582 |
| 2004/0136092 A1* | 7/2004 | Artonne | H04N 5/2254 359/724 |
| 2005/0265619 A1* | 12/2005 | Ozaki | G06T 3/0018 382/254 |
| 2006/0044151 A1* | 3/2006 | Nie | G06T 9/004 340/815.42 |
| 2006/0192853 A1* | 8/2006 | Lee | G06T 3/00 348/143 |
| 2007/0124783 A1* | 5/2007 | Ahiska | H04N 5/23206 725/105 |
| 2008/0049105 A1* | 2/2008 | Shimizu | G06T 7/73 348/148 |
| 2008/0231710 A1 | 9/2008 | Asari et al. | |
| 2008/0309784 A1* | 12/2008 | Asari | B60R 1/00 348/222.1 |
| 2009/0042173 A1 | 2/2009 | Jaxzlies et al. | |
| 2011/0032357 A1* | 2/2011 | Kitaura | B60R 1/00 348/148 |
| 2011/0115922 A1 | 5/2011 | Shimizu | |
| 2011/0310219 A1* | 12/2011 | Kim | G08B 13/19643 348/36 |
| 2012/0069187 A1* | 3/2012 | Ozaki | B60R 1/00 348/148 |
| 2012/0287233 A1* | 11/2012 | Wang | H04N 13/0022 348/42 |
| 2012/0293659 A1* | 11/2012 | Bandou | G06K 9/00791 348/148 |

FOREIGN PATENT DOCUMENTS

| | | |
|---|---|---|
| EP | 2 200 311 A1 | 6/2010 |
| EP | 2 234 399 A1 | 9/2010 |
| EP | 2 285 109 A1 | 2/2011 |

OTHER PUBLICATIONS

European Search Report for European Patent Application No. 11 003 828.8, 8 pgs., dated Sep. 22, 2011.
European Search Report from corresponding European Application No. 11 16 8355, dated Oct. 27, 2011.
European Search Report from corresponding European Patent Application No. 11172195.7-2218, dated Dec. 12, 2011.
Extended European Search Report issued in European Patent Application No. 11162470.6, (7 pgs.), dated Aug. 18, 2011.
European Search Report issued in European patent application No. 11176707.5-1523, 6pp., dated Dec. 29, 2011.
Chen, Y.Y. et al., "An Embedded System for Vehicle Surrounding Monitoring," 2009 2nd International Conference on Power Electronics and Intelligent Transportation System, *IEEE*, Piscataway, NJ, USA, Dec. 19, 2009, XP031624185, pp. 92-95.
Gandhi, Tarak et al., "Vehicle Surround Capture: Survey of Techniques and a Novel omni-Video-Based Approach for Dynamic Panoramic Surround Maps", *IEEE Transactions on Intelligent Transportation Systems*, 2006, vol. 7, No. 3, XP-002659721, pp. 293-308.
Liu, Y.C. et al., "Bird's-Eye View Vision System for Vehicle Surrounding Monitoring," in Robot Vision, Jan. 1, 2008, Springer Berlin Heidelberg, Berlin, Heidelberg, XP55004046, pp. 207-218.
Tsai, Roger Y., "A Versatile Camera Calibration Technique for High-Accuracy 3D Machine Vision Metrology Using Off-The-Shelf TV Cameras and Lenses", *IEEE Journal of Robotics and Automation*, 1987, vol. 3, No. 4, pp. 323-344.
Tsai, Roger Y., "An Efficient and Accurate Camera Calibration Technique for 3D Machine Vision", *Proceedings of IEEE Conference on Computer Vision and Pattern Recognition*, Miami Beach, FL, 1986, pp. 364-374.
Zhang, Z., "A Flexible New Technique for Camera Calibration", *IEEE Transactions on Pattern Analysis and Machine Intelligence*, 2000, vol. 22, No. 11, pp. 1330-1334.
Perdersini F., et al.,"Accurate and Simple Geometric Calibration of Multi-Camera Systems", Signal Processing, Elsevier Science Publishers B.V. Amsterdam, NL, vol. 77, No. 3, pp. 309-334, Sep. 1, 1999.
Forbes et al., "An Inexpensive, Automatic and Accurate Camera Calibration Method", Proceedings of the Thirteenth Annual South African Workshop on Pattern Recognition, 2002.
Stefan Vacek et al., "Road-Marking Analysis for Autonomous Vehicle Guidance", Online Proceedings of the 3rd European Conference on Mobile Robots, pp. 1-9, Sep. 19, 2007.
Douret J. et al., "A Volumetric Multi-Cameras Method Dedicated to Road Intelligent Vehicles Symposium", 2004 IEEE, pp. 442-446, Parma, Italy Jun. 17-17, 2004, Piscataway, NJ, USA IEEE Jun. 14, 2004.
Kunfeng Wang et al., "Research on Lane-Marking Line Based Camera Calibration", Vehicular Electronics and Safety, 2007, ICVES, IEEE International Conference on, IEEE, Piscataway, NJ, pp. 1-6, Dec. 13, 2007.

\* cited by examiner

SURROUND VIEW SYSTEM

BACKGROUND OF THE INVENTION

1. Priority Claim

This application claims the benefit of priority from European Patent Application No. 11 176 707.5, filed Aug. 5, 2011, which is incorporated by reference.

2. Technical Field

The invention relates to a surround view system.

3. Related Art

The use of image sensors in vehicles and other objects is proliferating. For example, image sensors may be used in a driver assist system in which the image sensors track a vehicle's environment, identify objects, and warn a respective driver of possible dangerous driving situations. Furthermore, for example, image sensors may be used as rear view cameras, which help the driver with parking the vehicle and help the driver to be informed of any obstacle located behind the vehicle.

It has been observed that vehicles equipped with rear vision systems have caused near accidents, as the view provided by the image sensors of a rear part of a vehicle suggests that a driver has more space than in reality. As imaginable, this may be a problem for a variety of systems and objects utilizing image sensors.

SUMMARY

A system is operable to generate a surround view based on image data, where the image data includes image data associated with surroundings of an object, such as a vehicle. The system is further operable to project the surround view inversely onto a bowl-shaped projection surrounding the vehicle; generate a virtual user view via a virtual camera position, where the virtual camera position is on a first horizontal ellipse about the bowl-shaped projection at a first height; and determine a viewing direction from the virtual camera position that is directed at a point located on a second horizontal ellipse about the bowl-shaped projection at a second height, where the second height is lower than the first height and the second horizontal ellipse is smaller than the first horizontal ellipse.

Other systems, methods, features and advantages may be, or may become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The surround view system (also referred as the SVS) may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
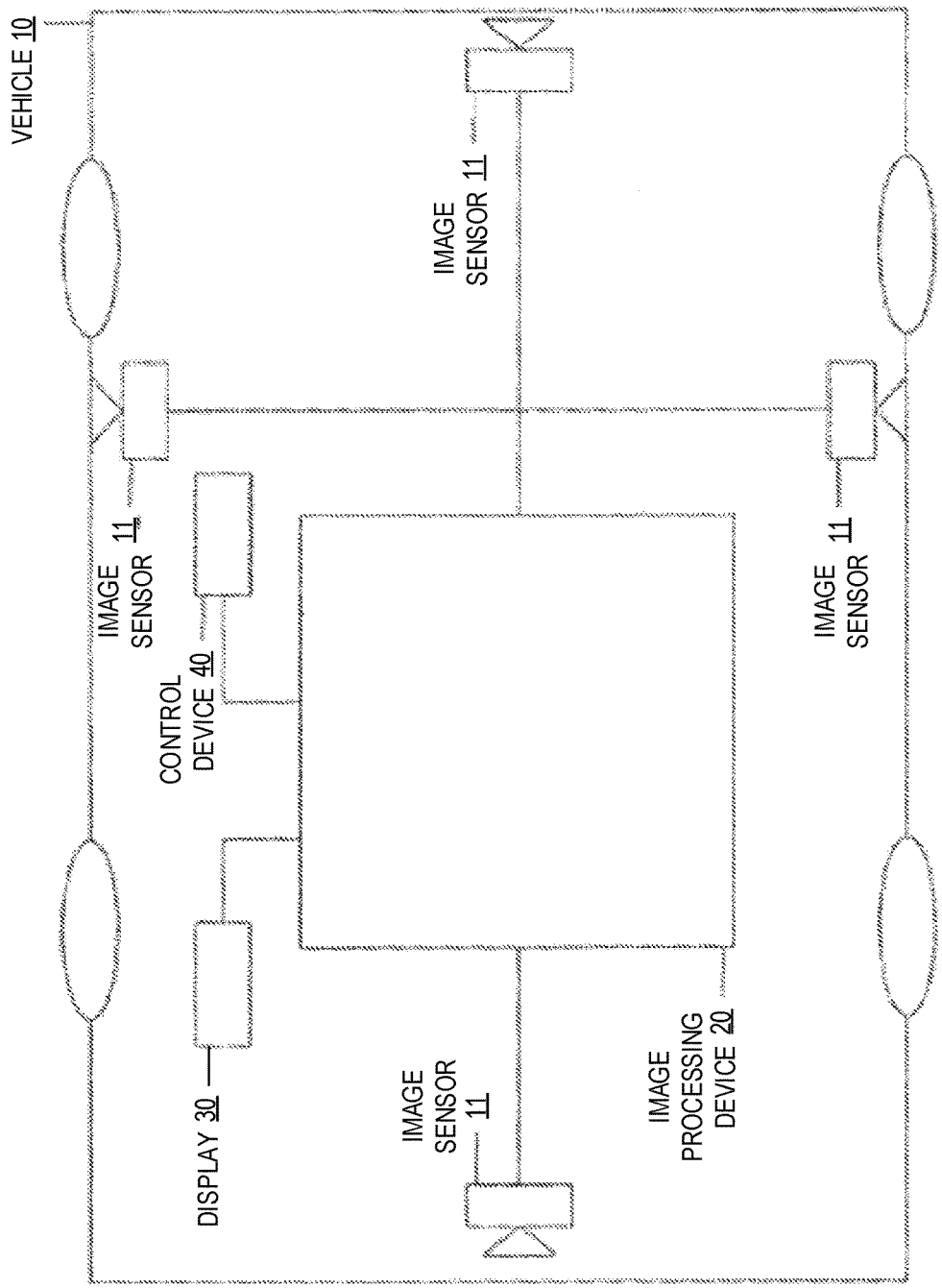
FIG. 1 shows a schematic view of an example vehicle surround view system.

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. One or more functional blocks or units may also be implemented in a common circuit, chip, circuit element or unit.

Described herein is a surround view system (the SVS). The SVS may be an information system, such as one used in a motor vehicle, for example.

With respect to one embodiment of the SVS, the SVS or an aspect of the SVS may include a plurality of image sensors provided at different locations on an object, such as a vehicle. The image sensors may generate image data of the object's surroundings (such as image data covering surroundings of a vehicle).

Furthermore, an image processing device may process the image data generated by the plurality of image sensors. The image processing device may be operable to generate a vehicle surround view based on the image data generated by the plurality of image sensors. For generating the vehicle surround view the image processing device may be configured to project the image data inversely on a bowl-shaped projection surrounding the object.

Furthermore, the image processing device may use a virtual camera position from which the vehicle surround view may be viewed in order to generate a virtual user view (such as a virtual user vehicle view). The virtual camera position may be a location and/or direction from where a simulated camera views and an object and surroundings; and the virtual user view may be a simulated view from the virtual camera position. For example, a virtual user vehicle view may be a simulated view from a viewpoint of user inside or outside a vehicle, such as a view of the vehicle or its surrounds. The image processing device allocates the virtual camera position on a first horizontal ellipse located at a first height around the vehicle. The first horizontal ellipse may be about the bowl-shaped projection.

Also, the image processing device may be operable to determine a viewing direction from the virtual camera position in such a way that it may point towards a location (such as a point) on a second horizontal ellipse located at a second vertical height around the vehicle. Likewise, the second horizontal ellipse may be about the bowl-shaped projection. The second horizontal ellipse may be lower than the first height, and the second horizontal ellipse may be smaller than the first horizontal ellipse.

Furthermore, a control device may be operable to allow a user (manually) or a computer system (automatically) to change the virtual camera position at least in a horizontal direction and to change the viewing direction. By providing the virtual camera position on the first horizontal ellipse and by using a viewing direction directed towards the second horizontal ellipse, a virtual user view may be obtained which corresponds to the view of a real person looking at the object. For example, a view may be obtained of a simulated user inspecting a rear part of a vehicle. Also, by providing the virtual camera position on the first horizontal ellipse, the virtual user view can be changed and walking of a real person around the object can be simulated.

The first horizontal ellipse provides a plane in which the virtual camera position may be located. The virtual camera position may be moved on the plane of the first horizontal ellipse to generate different virtual user views. For different virtual camera positions around the object, the virtual camera position may provide, on the first horizontal ellipse, the viewing direction directed towards the second horizontal ellipse independent of a selection of the viewing direction.

One manner of providing a virtual user view may be to use a first bottom height of the first horizontal ellipse and of the virtual camera position that may correspond to any eye level of a range of people (such a height of approximately four and a half feet to seven and a half feet). By locating the first horizontal ellipse in this range, a realistic representation of the vehicle surroundings can be obtained, for example. As the second horizontal ellipse may be lower than the first horizontal ellipse, the viewing direction may be tilted downwards so that the viewing direction may correspond to a natural viewing direction of a human being standing next to the object and looking at the object.

For changing the virtual view in one horizontal direction, the image processing device may be operable to first keep the virtual camera position fixed and to change the viewing direction in such a way that the viewing direction points towards a location (such as a point) on the second horizontal ellipse. The location of the second horizontal ellipse may move in the one horizontal direction on the second horizontal ellipse when the viewing direction is changed. In this example, when the user inputs a change of the viewing direction in the one horizontal direction, the virtual camera position may be kept unchanged and the viewing direction may be changed in such a way that the viewing direction continues to point towards the location on the second horizontal ellipse.

The location on the second horizontal ellipse may be in the one horizontal direction from which the user wants to have more information. This corresponds to a natural behavior of a human being who first, when desiring information from one direction, may turn his or her head to change the viewing direction in another direction. When changing the viewing direction, the view follows the second horizontal ellipse. When the viewing direction is changed to the right side, the viewing direction may follow points located on the second horizontal ellipse on the right side relative to the present virtual camera position. An analogous situation exists for viewing the other side of the object.

The viewing direction may follow points located on the second horizontal ellipse on the left side, for example. The more the viewing direction is changed away from the object, the further away the points are located on the second horizontal ellipse from the virtual camera position.

Further, the image processing device may be operable to keep the virtual camera position fixed and to change the viewing direction until a predefined maximum opening angle of the viewing direction at the center of a plane defined by the second horizontal ellipse may be obtained. When this maximum opening angle is obtained, the image processing device may be operable to move the virtual camera position on the first horizontal ellipse in the one horizontal direction, where the viewing direction continues to point towards the location on the second horizontal ellipse.

This way of controlling the virtual camera position and the viewing direction may improve a simulation of a person inspecting the object and/or the object's surroundings, especially in the back of the object. In this context, the image processing device may be operable such that when the virtual camera position on the first horizontal ellipse is moved in the one horizontal direction, the viewing direction may be determined for various positions of the virtual camera position on the first horizontal ellipse. The determination may be made in such a way that the viewing direction continues to point towards the location on the second horizontal ellipse in the one horizontal direction with the predefined maximum opening angle being maintained.

With respect to the maximum opening angle, an opening angle may be defined as the angle between a projection of a direct connection of the virtual camera position to the center of the second horizontal ellipse and a direct connection of the center of the second horizontal ellipse to the location on the second horizontal ellipse to which the viewing direction points towards.

Furthermore, it is possible that the image processing device determines the size of the second horizontal ellipse in such a way that the size of the second horizontal ellipse substantially corresponds to the object's size. Also, the center of the second horizontal ellipse and the center of the first horizontal ellipse can be selected, for example by the image processing unit, in such a way that they are located coaxially on an axis going through the center of the first and second horizontal ellipse (which may be approximately at the center of the object). When the size of the second horizontal ellipse corresponds to the object's size, the size of the first horizontal ellipse may be determined in such a way that the size of the first horizontal ellipse may be 10-30% greater than the size of the second horizontal ellipse.

The image processing device may further be configured to provide a default or starting virtual user view. With respect to this view, the virtual camera position is behind the object on a point on the first horizontal ellipse that is located on a first or major axis of the first horizontal ellipse. In this case, the viewing direction points towards the location on the second horizontal ellipse, where the location of the second horizontal ellipse may be on a first or major axis of the second horizontal ellipse. In this example, the first and the second horizontal ellipse may be arranged such that the major or first axis of the first and the second horizontal ellipse are parallel to each other. Also, this default or starting virtual user view may correspond to a view when the user is positioned behind the object in the middle of the object looking down at the object.

For facilitating the controlling of a virtual camera position and of the viewing direction by a user of the SES, the control device may contain a turning component which may be operable to be turned in one direction to indicate a change of the virtual user view in one horizontal direction, or turned in another direction to indicate a change of the virtual user view in another horizontal direction. The turning component may be part of a vehicle electronic system, such as a system used for controlling a radio receiver, an audio output device, a navigation device, or a telecommunication device in a vehicle, for example. By turning, for example, the turning component, the viewing direction and/or the virtual camera position can be changed automatically or manually.

Additionally, the image processing device may be operable to change the virtual camera position in a vertical plane from a second bottom height to a top view of the object. In this example, the size of the first and of the second horizontal ellipse may be based on the second bottom height and/or the height of the top view.

Vertical movement of the virtual camera position and the viewing direction may be such that the virtual camera position moves in a vertical direction on a first ellipsoidally shaped body defined by a first rotation of the first horizontal ellipse. This first rotation may be about a second or minor axis at the first bottom height of the first horizontal ellipse. This example of the viewing direction may continue to point towards a location on a second ellipsoidally shaped body defined by a second rotation of the second horizontal ellipse. This second rotation may be about a second or minor axis at the first bottom height of the second horizontal ellipse. When a position of the virtual camera position is determined, a corresponding position of the second horizontal ellipse may be determined so that an elevation angle of the virtual camera above a plane defined by the first horizontal ellipse at its first bottom height is the same as the elevation angle of the second horizontal ellipse relative to the second horizontal ellipse at its first bottom height.

In one example, the control device may have additional operating elements to change the viewing direction. For example, the control device may be able to change the virtual camera position in a horizontal and in a vertical direction.

With respect to another example of the SVS, the SVS or an aspect of the SVS (such as the image processing device or the control device) may perform a method for generating a surround view (such as a vehicle surround view). Aspects of this method may use a plurality of image sensors provided at different locations on an object such as a vehicle. According to one aspect of the method, image data collected by the plurality of image sensors may be processed to generate the surround view. The image data may be inversely projected on a bowl-shaped projection surrounding the object. A virtual user view may be generated in which the surround view is shown from a virtual camera position from which the surround view may be observed using a viewing direction. The virtual camera position may be allocated on a first horizontal ellipse located at the first height around the object, where the viewing direction from the virtual camera position may be such that it is pointing towards a location on a second horizontal ellipse located at a second height around the object. The first height may be above the second height, and the first horizontal ellipse may be larger than the second horizontal ellipse. With this method for generating the surround view, a user walking around the object can be simulated.

Furthermore, when a command for changing a virtual user view in one horizontal direction is detected, the virtual camera position may be kept unchanged at the beginning of the method. Then, in response to the detected command, the viewing direction may be changed in such a way that the viewing direction is directed towards a location on a second horizontal ellipse.

The virtual camera position may be kept unchanged until a predefined maximum opening angle of the viewing direction at the center of the plane defined by the second horizontal ellipse is obtained. When a command for a further change of the virtual user view in one horizontal direction is detected, the virtual camera position starts to move on the first horizontal ellipse in the one horizontal direction. In this case, the viewing direction continues to point towards a location on the second horizontal ellipse. As mentioned above, the viewing direction may be determined in such a way that the viewing direction continues pointing towards the location on the second horizontal ellipse. This location on the second horizontal ellipse may be determined such that the predefined maximum opening angle of the viewing direction is maintained when the virtual camera position is moved on the first horizontal ellipse. Also, when a command for changing the virtual user view in another horizontal direction is detected, the procedure may be analogous in the other direction. Further, the virtual user view can be displayed on a display.

FIG. 1 shows a schematic view of an example vehicle surround view system. In FIG. 1, a vehicle 10 is shown in which four image sensors 11, such as fish eye cameras, are incorporated. The image sensors may be placed in the perimeter of the vehicle 10 symmetrically in such a way that they cover the complete surrounding perimeter. For example, side cameras may be provided in the left and right door mirrors. Rear and the front cameras may be located in different locations depending on the type of vehicle utilizing the SVS. In this example embodiment, the SVS may include the image processing device 20 that receives image data captured by the image sensors 11 and which uses the image data in such a way that a vehicle surround view is generated.

The vehicle surround view may be derived using a virtual camera position and using a viewing direction of the virtual camera position. The vehicle surroundings as viewed or observed from the virtual camera position may be a virtual user vehicle view as the vehicle may be viewed by a simulated user 50 shown in FIG. 2 and located at the virtual camera position.

The virtual user vehicle view can be displayed on a display 30. A control device 40 may be provided with which the position and the viewing angle can be changed. For example, the control device 40 can be a common turn/press button as used in vehicle electronic systems, such as a vehicle audio system. For example, the shown vehicle surround view system of FIG. 1 can be part of a multi-media system, and the display 30 may be the display of the multi-media system.

The image processing device 20, for processing the image data collected by the image sensors 11, may contain one or more processor that processes the image data as described in detail below. The image processing device 20 may be a combination of hardware, software, and/or firmware.

Figure 2:
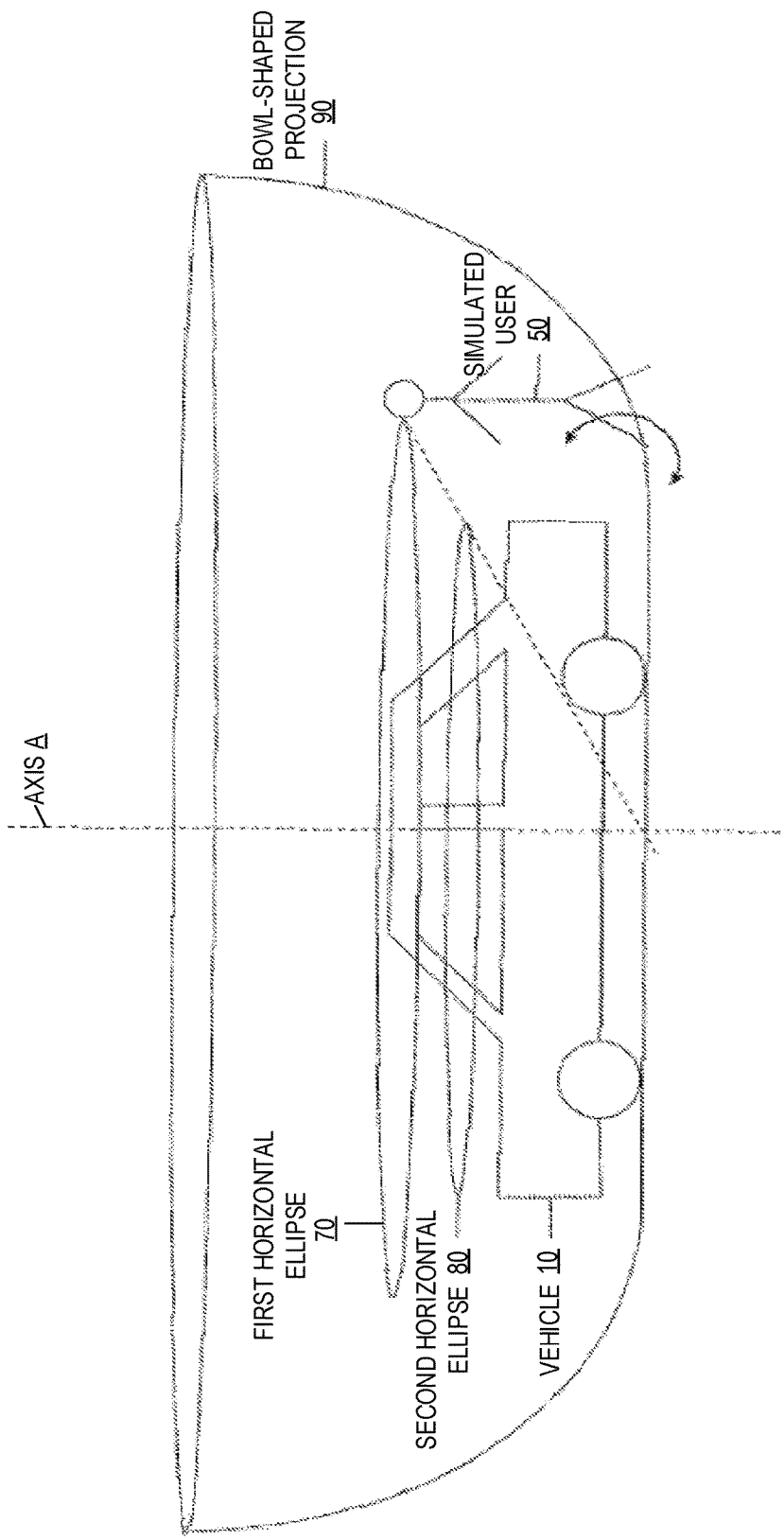
FIG. 2 shows example image data of an example vehicle surround view system being projected on an example bowl-shaped projection.
Figure 3:
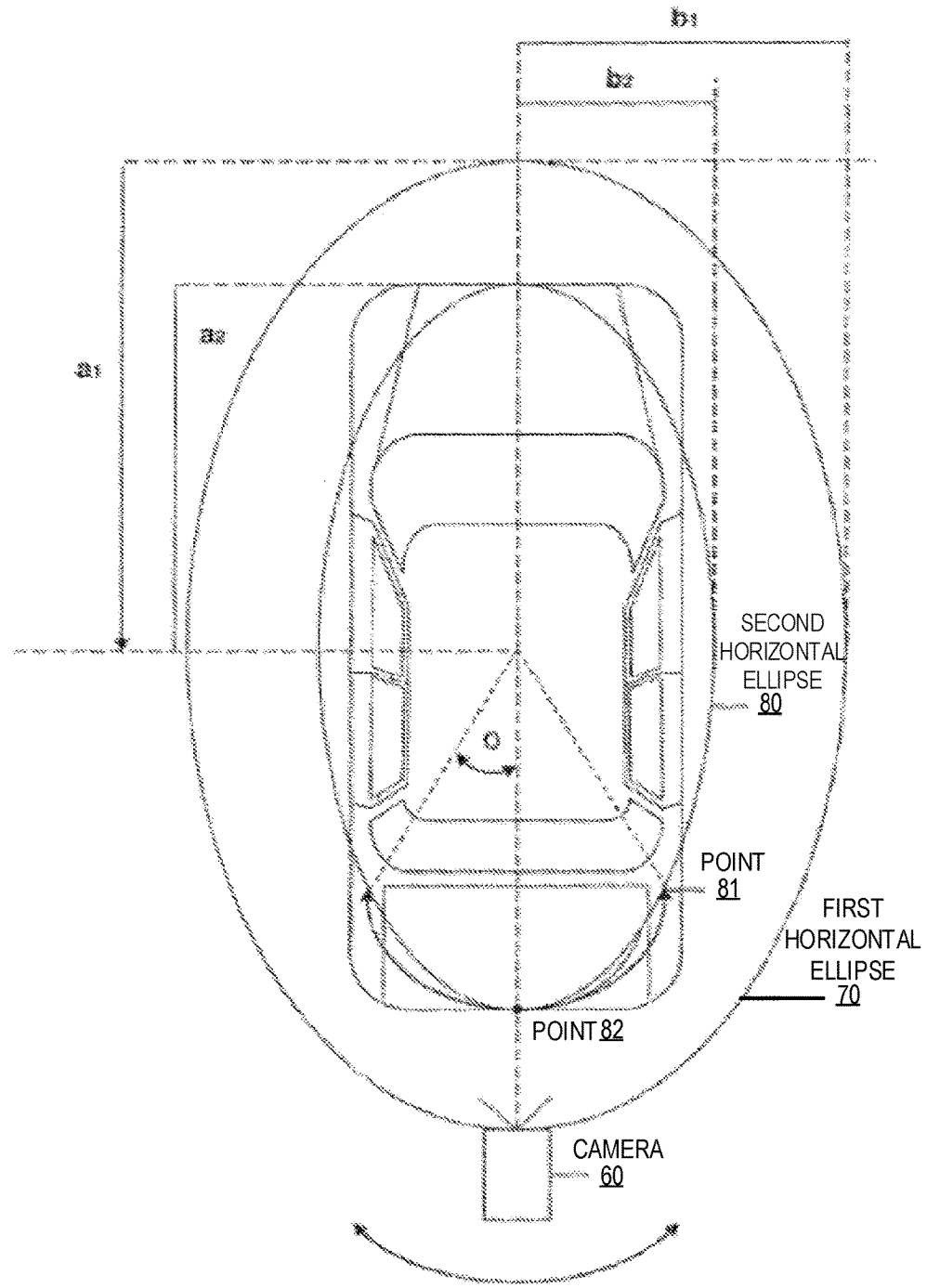
FIG. 3 shows a top view of an example starting vehicle view.

FIG. 2 shows example image data of an example vehicle surround view system being projected on a bowl-shaped projection. FIG. 3 shows an example of a top view of a starting vehicle view.

In FIG. 2, the simulated user 50 looks at the vehicle 10. The simulated user 50 may correspond to a virtual camera position of a virtual camera 60 in FIG. 3, for example. The virtual camera position may be located at a first height above ground on a first horizontal ellipse 70, shown in FIGS. 2 and 3. The height may be determined such that the height of the virtual camera position may be at approximately eye level of a user, or at approximately eye level of an average user, for example. The eye level may be, for example, between about 1.5 and about 1.8 meters. The viewing direction of the simulated user 50 may be such that the viewing direction may point towards a location on a second horizontal ellipse 80 that may be provided at a lower height than the first horizontal ellipse. Consequently, a view directed downwards may be obtained.

As depicted in FIGS. 2 and 3, the second horizontal ellipse has a size that corresponds to dimensions of the vehicle 10.

Also, as depicted in FIG. 2, the image data of the fish eye cameras 11, such as the four fish eye cameras shown in FIG. 1 are inversely projected on a bowl-shaped projection 90 that surroundings the vehicle 10. A vehicle or another object may be located on the bottom or ground floor of such a bowl-shaped projection. As the vehicle has a rectangular form and is not quadratic, the bowl-shaped projection may be stretched along a vehicle axis. The bowl-shaped projection may be constituted of different horizontal slices of ellipsoidal shape. This ellipsoidal shape may be further pronounced towards the upper end of the bowl-shaped projection. The shape of the horizontal slices may gradually change from an elliptical shape to a curved rectangle shape as moving downward through the bowl.

FIGS. 2 and 3 also depict a starting vehicle view in which the virtual camera position may be positioned as shown in FIG. 3 on the first horizontal ellipse on a point of a major axis of the first horizontal ellipse. In this scenario, the viewing direction is towards a point 82 on the second horizontal ellipse and on its major axis. In this starting vehicle view, the first horizontal ellipse has a first bottom height (as shown in FIG. 2); and the second horizontal ellipse 80 has a second bottom height, as also shown in FIG. 2. For example, the first horizontal ellipse may be located between about 1.60-1.80 meters above the ground; the second horizontal ellipse 80 may be located between about 1.20 and 1.30 meters above the ground. The bowl-shaped projection, on its upper end, may have a major axis having an overall length of about 14 meters. Moving downwards, at a height of 1.7 m, for example, the bowl-shaped projection may have an overall length of approximately 11 or 12 meters and a width of approximately 8 meters. At the starting vehicle view the ellipse 70 may have a semi-major axis a1 as shown in FIG. 3 of approximately 3.5 meters, and a semi-minor axis b1 being in the range of 2.4 to 2.8 m. Center axes of the first and of the second horizontal ellipse may be located on the same axis, and they may be arranged coaxially at different heights on axis A shown in FIG. 2.

The semi-major axis of the second horizontal ellipse 80 may be about 2.3 meters, and the semi-minor axis b2 may be 1.5 meters, for example. These values depend on the size of the vehicle and on the size of the bowl-shaped projection, for example.

As depicted in FIG. 2, the simulated user 50 may be located inside the bowl-shaped projection, and may be represented by the virtual camera 60 having a virtual camera position, as shown in FIG. 3. The size of the first and the second horizontal ellipse may be selected in a different way. If the size of the second horizontal ellipse is selected to be larger, the size of the first horizontal ellipse also should be selected to be larger as the viewing direction should be directed towards the vehicle. When the user, starting from the position shown in FIG. 3, wants to have a more detailed view of the right side of the vehicle as shown in FIG. 3, the user may turn, for example, the control device 40 shown in FIG. 1 to the right to indicate the user's intention.

Figure 4:
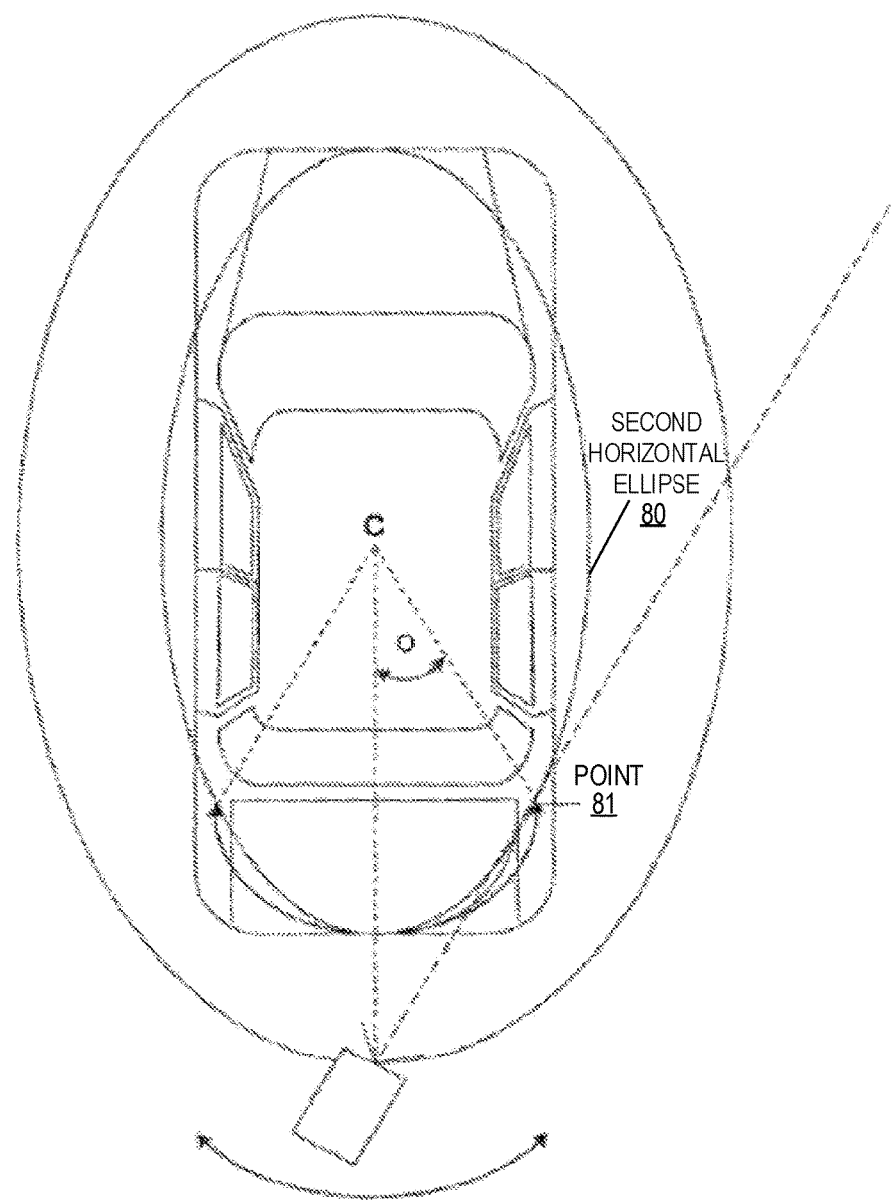
FIG. 4 shows a top view of an example vehicle, where a user looks to a right side of the vehicle with an example virtual camera position being unchanged.
Figure 5:
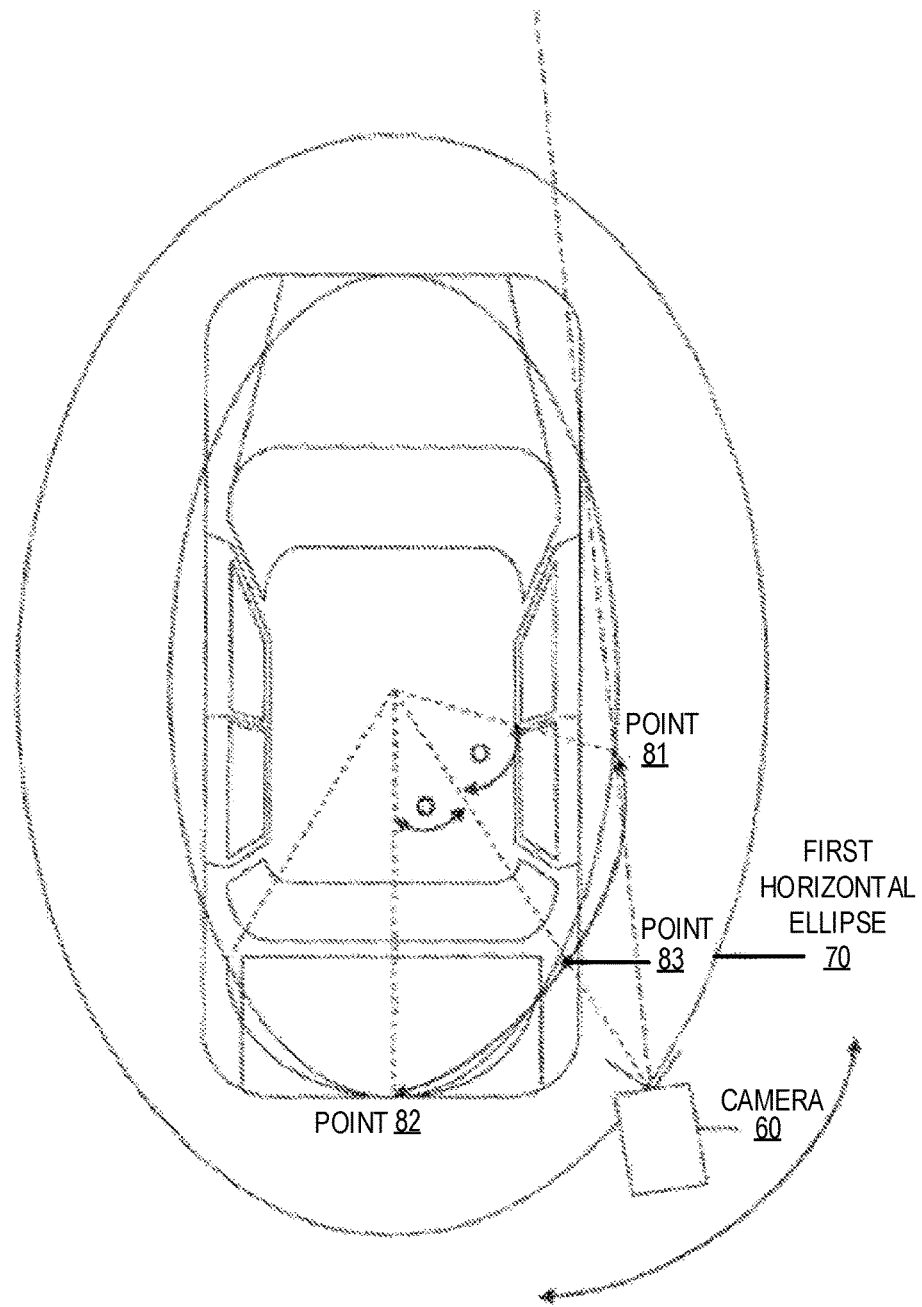
FIG. 5 shows a top view of an example vehicle, where an example virtual camera position is being moved to a right side of the vehicle.

FIG. 4 shows a top view of an example vehicle, where a user looks to a right side of the vehicle with an example virtual camera position being unchanged. FIG. 5 shows a top view of an example vehicle, where an example virtual camera position is being moved to a right side of the vehicle.

As shown in FIG. 4, when an aspect of the SVS detects that the user is interested in having a more detailed view of the right side of the vehicle, the virtual camera position may be maintained, and the viewing angle may be directed to the right side. When the viewing angle is changed from the direction shown in FIG. 3 to the direction shown in FIG. 4, the viewing direction may be such that during the movement the viewing direction, the viewing direction points towards points located on the second horizontal ellipse 80. In FIG. 4, the viewing direction points towards point 81 of the second horizontal ellipse. The viewing direction may be changed until a maximum angle O (shown in FIG. 4) is obtained. In this case, the maximum angle O is the maximum opening angle of the viewing direction.

Also, as shown in FIG. 4 the angle O may be defined by the projection of a direct line of sight of the camera to the center C on a plane defined by the second horizontal ellipse and by a direct line of the center C to the point 81.

When the maximum opening angle is attained and when further movement of the virtual camera position is desired, the virtual camera position may be moved in the direction as shown in FIG. 5. As depicted in FIG. 5, the viewing direction is, during the movement of the virtual camera position, adapted in such a way that the maximum opening angle O may be maintained, so that, when the virtual camera position moves point 81 to the right along the second horizontal ellipse it moves further away from the camera 60. Also, as shown in FIG. 5, the virtual camera position may stay either with the viewing direction as shown or in a viewing direction pointed towards the center of the vehicle and towards point 83 on the second horizontal ellipse.

Figure 6:
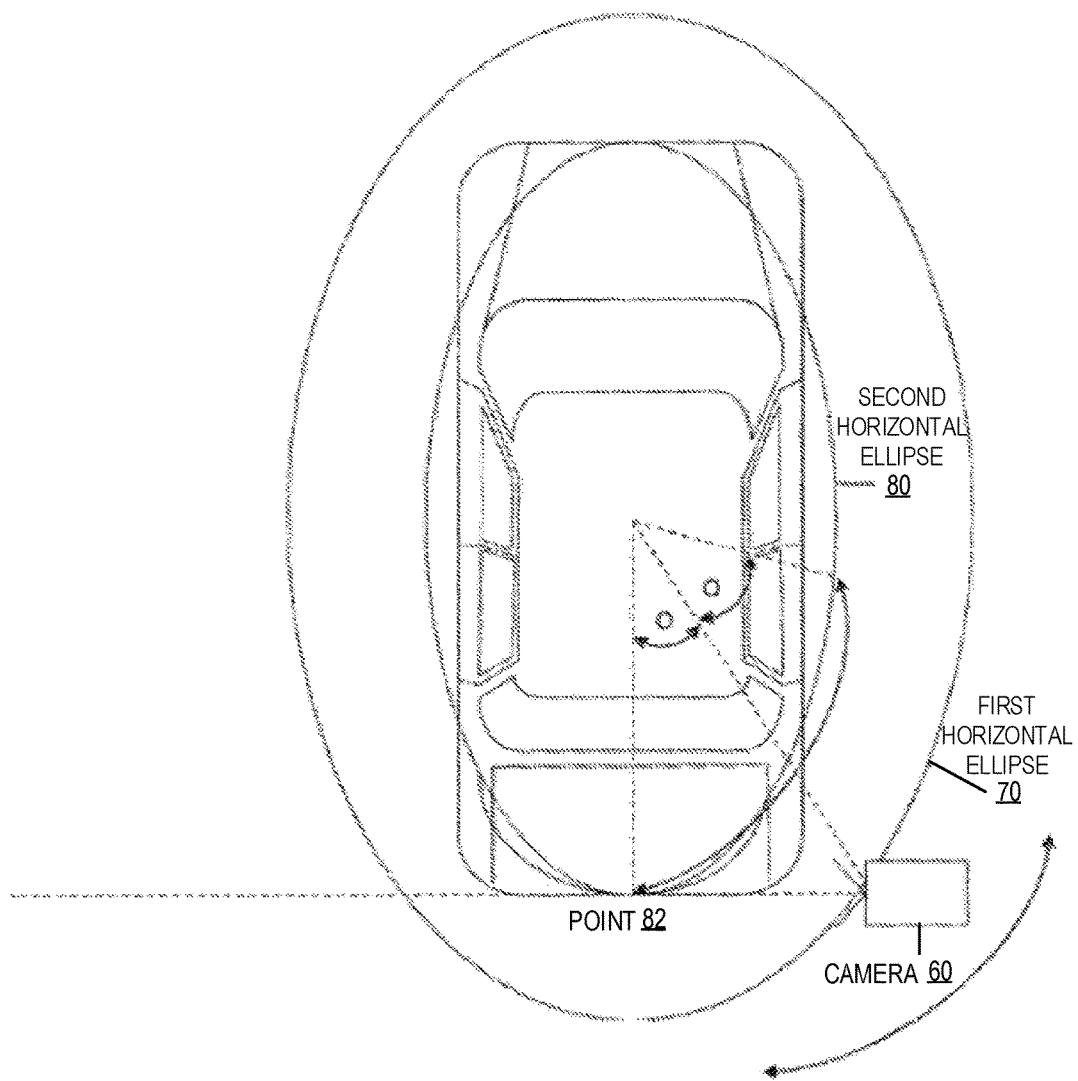
FIG. 6 shows a top view of an example vehicle, where an example virtual camera position is changed to a rear part of the vehicle and a left side of the vehicle.
Figure 7:
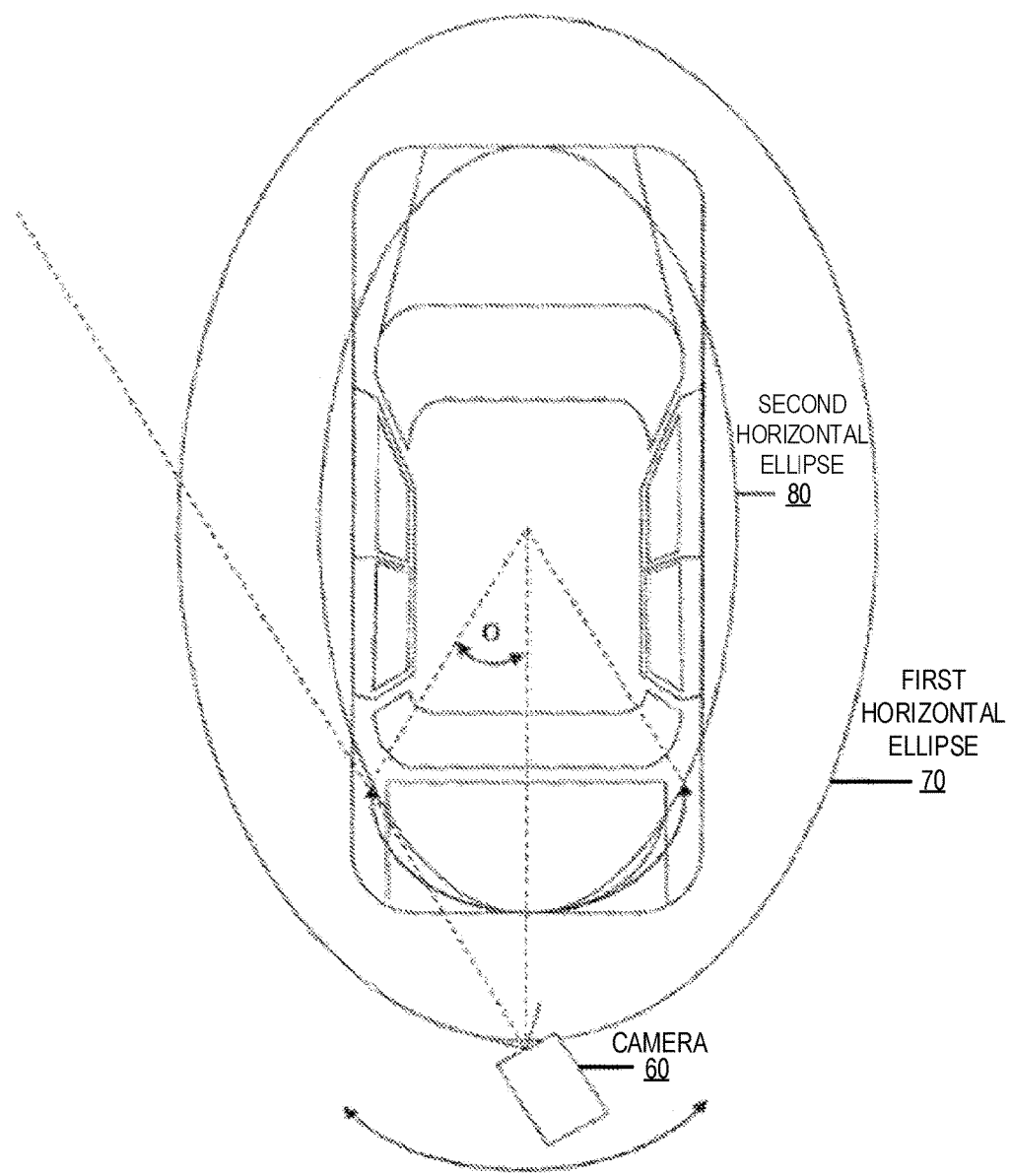
FIG. 7 shows a top view of an example vehicle, where an example viewing direction is changed from a starting vehicle view to a left side of the vehicle.
Figure 8:
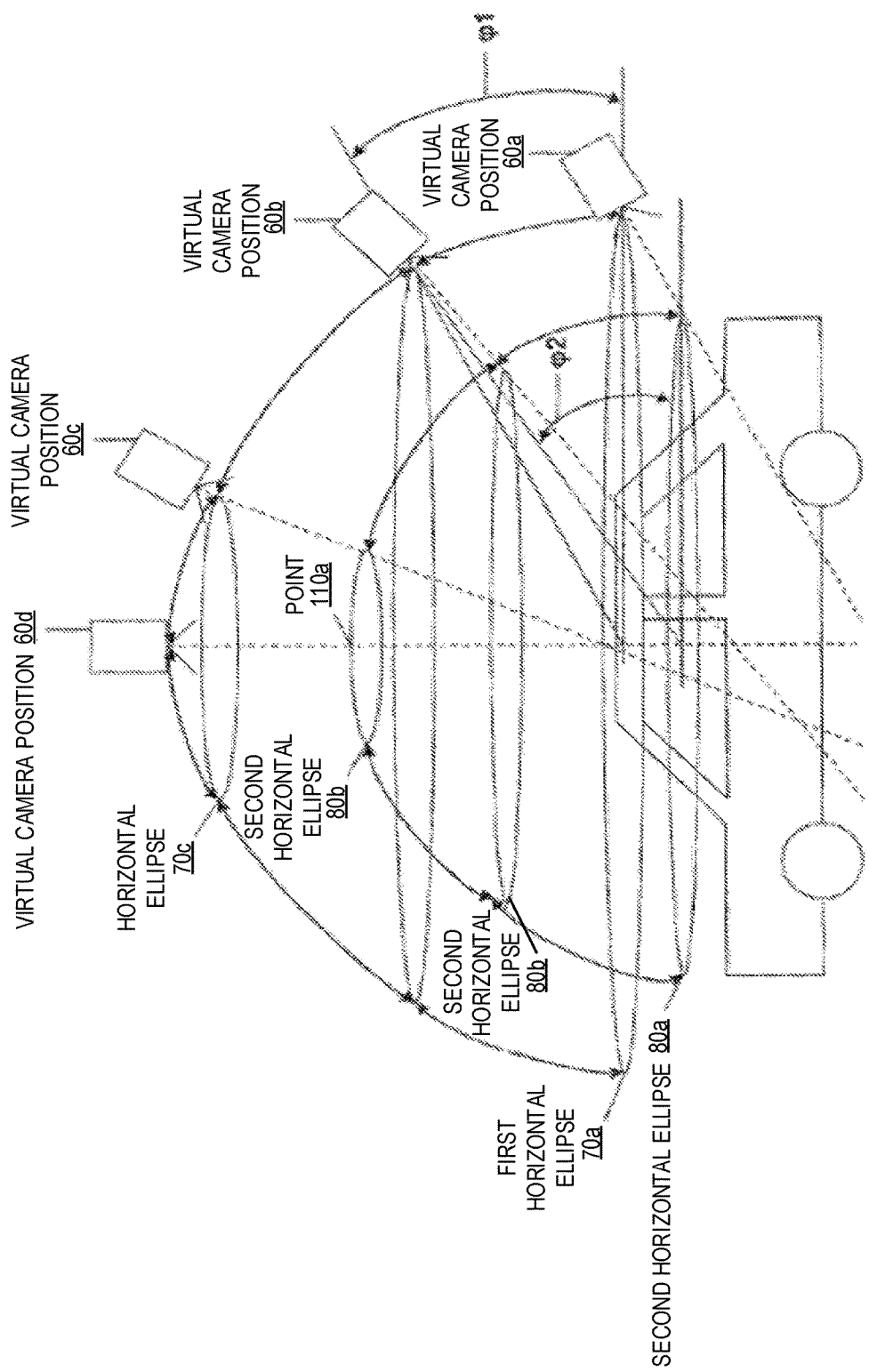
FIG. 8 shows a side view of an example vehicle and movement of an example virtual camera position and an example viewing direction in a vertical direction.

FIG. 6 shows a top view of an example vehicle, where an example virtual camera position is changed to a rear part of the vehicle and a left side of the vehicle. FIG. 7 shows a top view of an example vehicle, where an example viewing direction is changed from a starting vehicle view to a left side of the vehicle. FIG. 8 shows a side view of an example vehicle and movement of an example virtual camera position and an example viewing direction in a vertical direction.

In FIG. 6, illustrated is how the SVS reacts when the user instructs the system to the other side of the vehicle (in this case, the left side). The virtual camera 60 changes the viewing direction and maintains the virtual camera position. The viewing direction may be again changed in such a way that the viewing direction is changed to the left until the maximum opening angle O is attained. For example, when a user instructs the SVS to look to the left side of the vehicle, the virtual camera position may move on the first horizontal ellipse in the other direction with the maximum opening angle O being maintained during the movement of the virtual camera 60. When the user has finished requesting the virtual camera 60 to move in one of the two directions, the camera may stay in an angled position (such as the position as shown in FIG. 7 or 5) or the viewing direction may return to the center of the vehicle (such as center C).

Figure 10:
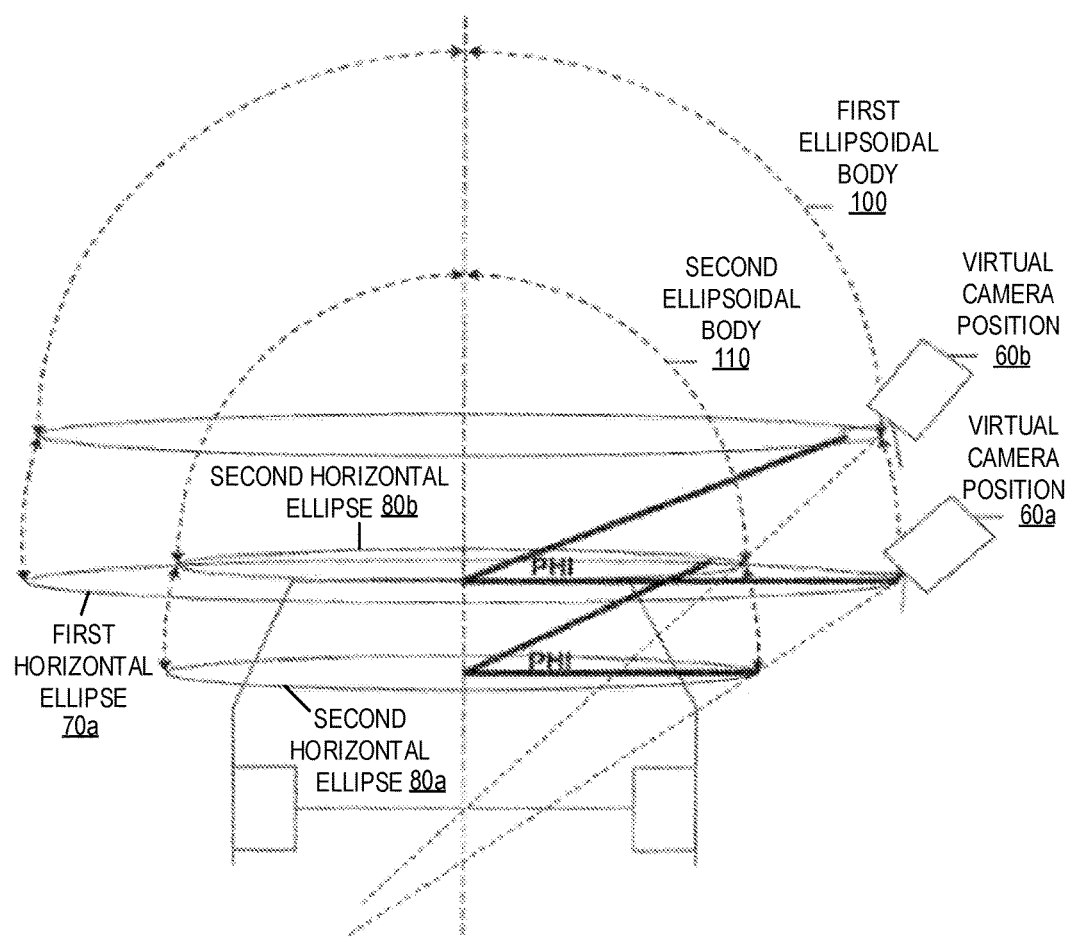
FIG. 10 shows example movement of the vertical camera position of FIG. 8 on an example ellipsoidally shaped body in a vehicle rear view.

In one aspect of the SES, the system may also change the vertical position of the virtual camera. In FIG. 8 and FIG. 10, depicted is the starting vehicle view with a virtual camera position 60a in which the first and the second horizontal ellipse 70a, 80a are provided at the first bottom height and at the second bottom height, respectively. A camera may be moved on an ellipsoidally shaped body, such at the ellipsoidally shaped body 100. This body may be defined by rotating the first horizontal ellipse 70a at its bottom height about its minor axis. The body defined by its rotation being the body on which the vertical camera position may be moved.

At the same time the second horizontal ellipse 80 may be also moved upwards as shown by ellipse 80b, the second horizontal ellipse also moving on an ellipsoidal body 110 defined by a rotation of the second horizontal ellipse at the bottom vertical height around its minor axis. The second horizontal ellipse 80b may be moved in the vertical direction in such a way that, when the virtual camera position is moved along the first ellipsoidal body 100 until a desired elevation angle is obtained (such as φ1 shown in FIG. 8 and FIG. 10), the same elevation angle φ2=φ1 may be used in the coordinate system defined by the second horizontal ellipse 80a. The same may apply for the virtual camera position 60c, horizontal ellipse 70c, and second horizontal ellipse 80c, depicted in FIG. 8. The position 60d in the position above the vehicle center the situation may be different, as the viewing direction is not on the second horizontal ellipse, but is straight downwards. In short, the second horizontal ellipse is a point on the second ellipsoidal body 110. For example, the second horizontal ellipse may be point 110a on the second ellipsoidal body.

As is apparent from these figures, an image sensor may be moved in different vertical and horizontal directions along various ellipses and ellipsoidal shapes about an object (such as a vehicle). Also, in one aspect, the object remains approximately centered with respect to a virtual user view.

Figure 9:
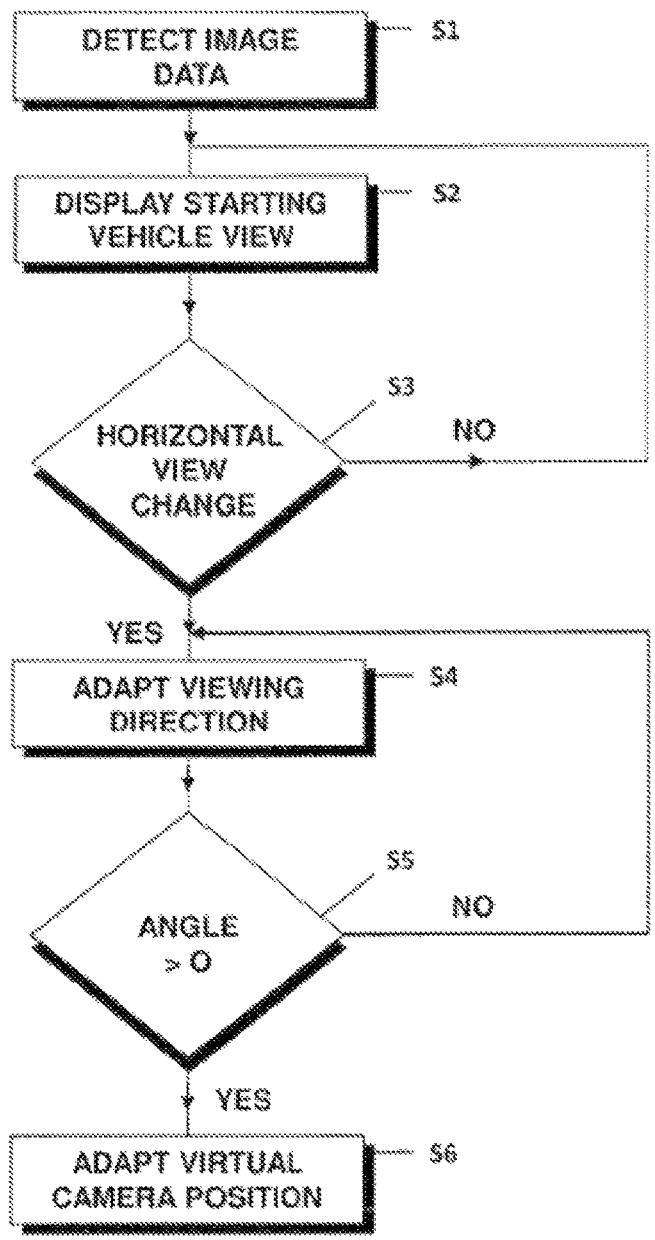
FIG. 9 shows a flowchart indicating how a virtual user vehicle view may be generated and adapted.

FIG. 9 shows a flowchart indicating how a virtual user vehicle view may be generated and adapted. At aspect S1, the image sensors (such as image sensors 11) generate image data that cover an object and/or surroundings of the object (such as the vehicle 10 and/or surrounding of the vehicle). A processing device (such as the processing device 20) may combine the image data from the image sensors and project the data inversely on bowl-shaped projection (such as the bowl-shaped projection 90 shown in FIG. 1).

At aspect S2, a starting virtual user view (such as a starting virtual user vehicle view) may be displayed in which the camera and the viewing direction may be selected (automatically or manually) as shown in FIG. 3.

At aspect S3, the image processing device determines whether a command for a horizontal view change is detected. If a request for such a change is not detected, an initial displayed image remains, which reflects the starting virtual user view. If the system detects a request for a horizontal view change, either in one direction or in another direction, on the first horizontal ellipse, the viewing angle may be adapted accordingly (as shown in FIG. 3).

For example, if a request is detected that the left side of the vehicle should be shown in more detail, the viewing direction may be adapted accordingly by moving the viewing direction along the points located on the second horizontal ellipse to the left until the maximum opening angle O is obtained at aspect S4.

In aspect S5, the image processing device determines whether the predefined maximum opening angle is attained. If it is not obtained, the viewing angle may be further adapted as mentioned in the aspect S4. If it is detected that the predefined maximum opening angle is attained, the virtual camera position may be adapted accordingly at aspect S6.

With respect to the method explained in connection with FIG. 9, an aspect of the SVS may obtain an overview of an object and/or an object's surroundings by moving a virtual camera on a first horizontal ellipse around the object. The different views can be obtained by a user using a two-way operating element or control device. Additionally, the control device may be operable to adjust the height of the virtual camera position. The vertical movement of the camera can be obtained in addition to and independently from the horizontal movement. For changing the vertical position of the virtual camera position, a two-way operating element may also be provided.

In short, through the SVS or an aspect of the SVS, vehicle surround view of an object may be provided as if a person was walking around the object and looking in various directions.

Figure 11:
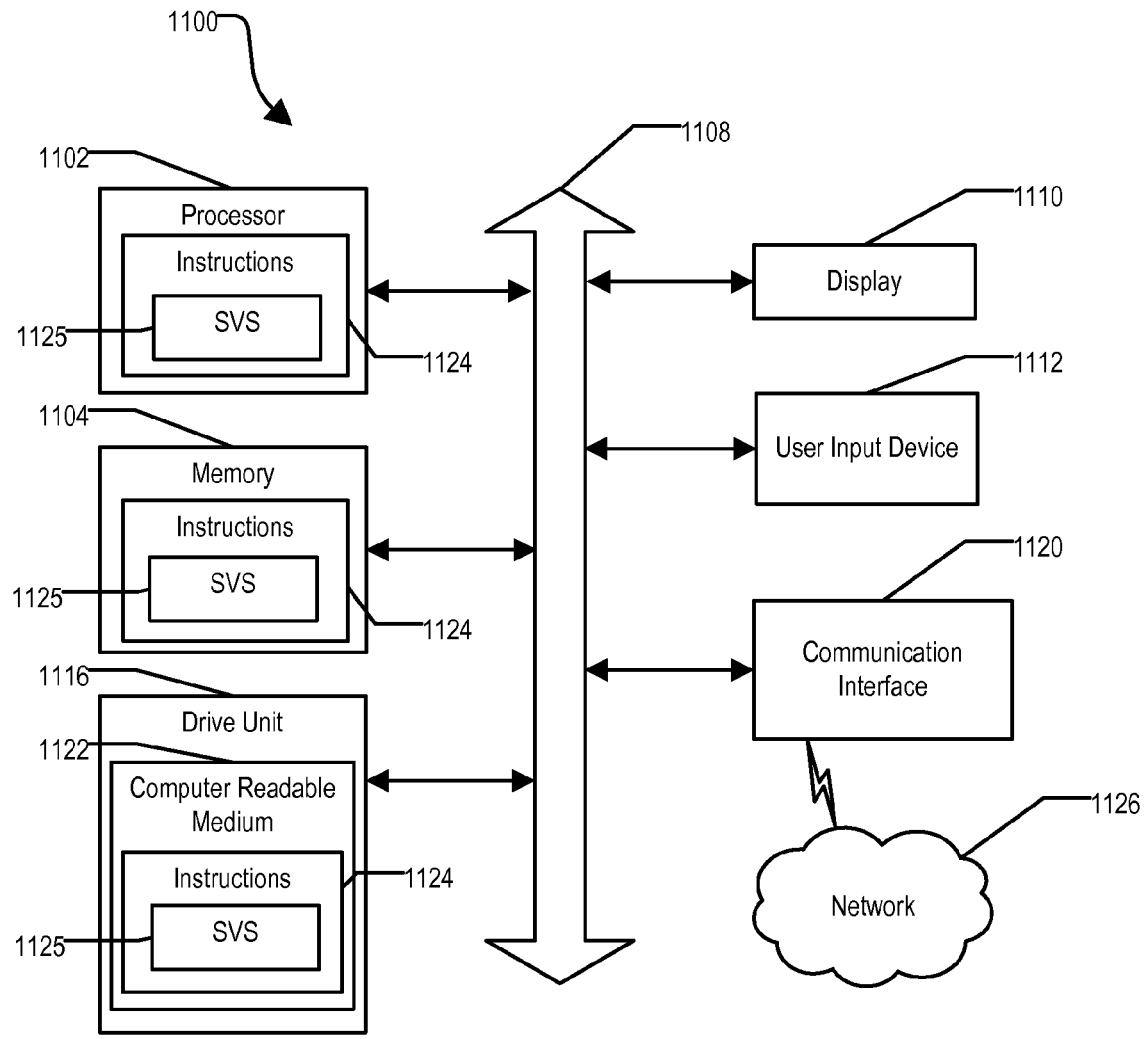
FIG. 11 is a block diagram of an example computer system that may be included or used with an aspect of the SVS.

Furthermore, the SVS, one or more aspects of the SVS, or any other device or system operating in conjunction with the SVS may include a portion or all of one or more computing devices of various kinds, such as the computer system 1100 in FIG. 11. The computer system 1100 may include a set of instructions that can be executed to cause the computer system 1100 to perform any one or more of the methods or computer based functions disclosed. The computer system 1100 may operate as a standalone device or may be connected, such as, using a network, to other computer systems or peripheral devices.

The computer system 1100 may be implemented using electronic devices that provide voice, audio, video or data communication. While a single computer system 1100 is illustrated, the term "system" may include any collection of systems or sub-systems that individually or jointly execute a set, or multiple sets, of instructions to perform one or more computer functions.

The computer system 1100 may include a processor 1102, such as a central processing unit (CPU), a graphics processing device (GPU), a digital signal processor, or some combination of different or the same processors. The processor 1102 may be a component in a variety of systems. The processor 1102 may be one or more general processors, digital signal processors, application specific integrated circuits, field programmable gate arrays, servers, networks, digital circuits, analog circuits, combinations thereof, or other now known or later developed devices for analyzing and processing data. The processor 1102 may implement a software program, such as code generated manually or programmed.

The term "module" may be defined to include a plurality of executable modules. The modules may include software, hardware, firmware, or some combination thereof executable by a processor, such as processor 1102. Software modules may include instructions stored in memory, such as memory 1104, or another memory device, that may be executable by the processor 1102 or other processor. Hardware modules may include various devices, components, circuits, gates, circuit boards, and the like that are executable, directed, or controlled for performance by the processor 1102.

The computer system 1100 may include a memory 1104, such as a memory 1104 that can communicate via a bus 1108. The memory 1104 may be a main memory, a static memory, or a dynamic memory. The memory 1104 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1104 includes a cache or random access memory for the processor 1102. In alternative examples, the memory 1104 may be separate from the processor 1102, such as a cache memory of a processor, the system memory, or other memory. The memory 1104 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1104 is operable to store instructions executable by the processor 1102. The functions, acts or tasks illustrated in the figures or described may be performed by the programmed processor 1102 executing the instructions stored in the memory 1104. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 1100 may be in communication with, may include, or may not further include a display device 1110, such as a liquid crystal display (LCD), an organic light emitting diode (OLED), a flat panel display, a solid state display, a cathode ray tube (CRT), a projector, a printer or other now known or later developed display device for outputting determined information. The display 1110 may act as an interface for the user to see the functioning of the processor 1102, or specifically as an interface with the software stored in the memory 1104 or in the drive device 1116.

The computer system 1100 may include an input device 1112 configured to allow a user to interact with any of the components of computer system. The input device 1112 may be a keypad, a keyboard, or a cursor control device, such as a mouse, or a joystick, touch screen display, remote control or any other device operative to interact with the computer system 1100. For example, a user of a navigation system may input criteria or conditions to be considered by a navigation device in calculating a route using the input device 1112.

The computer system 1100 may include a disk or optical drive device 1116. The disk drive device 1116 may include a computer-readable medium 1122 in which one or more sets of instructions 1124 or software can be embedded. The instructions 1124 may embody one or more of the methods or logic described herein, including aspects of the SVS 1125. The instructions 1124 may reside completely, or partially, within the memory 1104 or within the processor 1102 during execution by the computer system 1100. The memory 1104 and the processor 1102 also may include computer-readable media as discussed above.

The computer system 1100 may include computer-readable medium that includes instructions 1124 or receives and executes instructions 1124 responsive to a propagated signal so that a device connected to a network 1126 can communicate voice, video, audio, images or any other data over the network 1126. The instructions 1124 may be transmitted or received over the network 1126 via a communication port or interface 1120, or using a bus 1108. The communication port or interface 1120 may be a part of the processor 1102 or may be a separate component. The communication port 1120 may be created in software or may be a physical connection in hardware. The communication port 1120 may be configured to connect with a network 1126, external media, the display 1110, or any other components in the computer system 1100, or combinations thereof.

The term "computer-readable medium" may include a single storage medium or multiple storage media, such as a centralized or distributed database, or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In alternative examples, dedicated hardware implementations, such as application specific integrated circuits, programmable logic arrays and other hardware devices, may be constructed to implement various aspects of the SVS. One or more examples described may implement functions using two or more specific interconnected hardware modules or devices with related control and data signals that can be communicated between and through modules, or as portions of an application-specific integrated circuit. The SVS may encompass software, firmware, and hardware implementations.

The SVS described may be implemented by software programs executable by a computer system. Implementations can include distributed processing, component/object distributed processing, and parallel processing. Alternatively, virtual computer system processing can be constructed to implement various aspects of the SVS.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the invention have been described, it may be apparent to those of ordinary skill in the art that many more embodiments and implementations are possible within the scope of the invention. For example, much of the above description presents aspects of the invention utilized by vehicle surround view systems; however, other types of surround view systems may utilize these aspects and other aspects of the invention as well. Accordingly, the invention is not to be restricted except in light of the attached claims and their equivalents.

We claim:

1. A surround view system comprising:
an image processing device including a processor and memory storing instructions executable to:
generate a surround view based on image data collected from image sensors, where the surround view projects the image data inversely on a bowl-shaped projection surrounding an object; and
generate a virtual user view from a virtual camera position at a viewing direction, where the virtual camera position is on a first horizontal ellipse parallel to the ground at a first height above the ground, and the viewing direction directs from the virtual camera position to a point located on a second horizontal ellipse having a major axis and a minor axis that is parallel to the ground at a second height above the ground, where the major axis is longer than the minor axis, where the second height is lower than the first height, where the second horizontal ellipse is smaller than the first horizontal ellipse, and where each of the first horizontal ellipse and the second horizontal ellipse is smaller than the bowl-shaped projection at associated respective vertical locations of the bowl-shaped projection and each of the first horizontal ellipse and the second horizontal ellipse extends around the object; and
a control device including one or more operating elements to change the viewing direction and to change the virtual camera position at least in a horizontal direction, where the virtual camera position and the viewing direction are derived from the first and second horizontal ellipses, and where the image processing device is operable to:
maintain the virtual camera position and to change the viewing direction by moving the point located on the second horizontal ellipse in response to a command of changing the viewing direction.

2. The surround view system according to claim 1, where the instructions are further executable to:
maintain the virtual camera position and to change the viewing direction, so that an opening angle of the viewing direction is within a predefined maximum opening angle, wherein the opening angle of the viewing direction is defined by a projection of a direct line of the virtual camera position to a center of the second horizontal ellipse and by a direct line of the center of the second horizontal ellipse to the point located on the second horizontal ellipse, and wherein, when changing the viewing direction, the viewing direction follows points located on the second horizontal ellipse to continue directing from the virtual camera position to the second horizontal ellipse.

3. The surround view system according to claim 2, where the instructions are further executable to:

adjust the viewing direction of the virtual camera position on the first horizontal ellipse to maintain the opening angle within the predefined maximum opening angle.

4. The surround view system according to claim 1, where the instructions are further executable to determine a perimeter of the second horizontal ellipse so that the perimeter of the second horizontal ellipse corresponds to a perimeter of the object, and where a size of the first horizontal ellipse is within a range of ten to thirty percent greater than a size of the second horizontal ellipse.

5. The surround view system according to claim 1, where:
the instructions are further executable to provide a starting object view in which the virtual camera position is behind the object at a point of the first horizontal ellipse that is located on a first axis of the first horizontal ellipse, and
where the viewing direction points towards a location on the second horizontal ellipse that is located on a first axis of the second horizontal ellipse, where the first axis of the first horizontal ellipse is a major axis of the first horizontal ellipse and the first axis of the second horizontal ellipse is the major axis of the second horizontal ellipse.

6. The surround view system according to claim 1, where the instructions are further executable to position the first horizontal ellipse and the second horizontal ellipse coaxially and parallel to each other and wherein the first height of the first horizontal ellipse is within a range of four and a half feet to seven and a half feet above the ground and the viewing direction is tilted downward toward the second horizontal ellipse.

7. The surround view system according to claim 1, where the control device contains a turning element that is a part of a vehicle electronic system used for controlling another device in a vehicle, the turning element operable to be:
turned in a first direction, to indicate a change of the virtual camera position in a first horizontal direction; and
turned in a second, different direction, to indicate a change of the virtual camera position in a second horizontal direction, where the object remains centered with respect to the virtual user view as the virtual camera position changes in each of the first and second horizontal directions.

8. The surround view system according to claim 1, where:
the instructions are further executable to change the virtual camera position vertically from a first height to a second height above the object, and
where a perimeter of the second horizontal ellipse and a perimeter of the first horizontal ellipse are based on the second height above the object.

9. The surround view system according to claim 1, where:
the instructions are further executable to change the virtual camera position in a direction about a first ellipsoidally shaped body defined by a rotation of the first horizontal ellipse, and
where the viewing direction points towards a location on a second ellipsoidally shaped body defined by a rotation of the second horizontal ellipse.

10. A method comprising:
generating via an image processing device of a surround view system, a surround view based on image data corresponding to surroundings of an object;
projecting the surround view inversely onto a bowl-shaped projection surrounding the object;
generating a virtual user view via a virtual camera position and a viewing direction, where the virtual camera position is on a first horizontal ellipse located parallel to the ground at a first height above the ground, and the viewing direction directs from the virtual camera position to a point located on a second horizontal ellipse located parallel to the ground at a second height above the ground, where the second horizontal ellipse has a major axis and a minor axis, the major axis being longer than the minor axis, where the second height is lower than the first height, where the second horizontal ellipse is smaller than the first horizontal ellipse, and where each of the first horizontal ellipse and the second horizontal ellipse is smaller than the bowl-shaped projection at associated respective vertical locations of the bowl-shaped projection and each of the first horizontal ellipse and the second horizontal ellipse extends around the object; and adjusting, via a control device, the viewing direction and the virtual camera position at least in a horizontal direction, wherein the virtual camera position and the viewing direction are determined based on the first and second horizontal ellipses, the method further comprising:

maintaining the virtual camera position; and changing the viewing direction by moving the point located on the second horizontal ellipse responsive to a command for a horizontal view change.

11. The method according to claim 10, further comprising:

maintaining the virtual camera position; and changing the viewing direction until a predefined maximum opening angle of the viewing direction is obtained, wherein an opening angle of the viewing direction is defined by a projection of a direct line of the virtual camera position to a center of the second horizontal ellipse and by a direct line of the center of the second horizontal ellipse to the point located on the second horizontal ellipse.

12. The method according to claim 11, further comprising:

changing the virtual camera position on the first horizontal ellipse in a horizontal direction; and determining the viewing direction of the virtual camera position on the first horizontal ellipse so that the predefined maximum opening angle is maintained.

13. The method according to claim 10, further comprising:

determining a perimeter of the second horizontal ellipse, where the perimeter of the second horizontal ellipse corresponds to a perimeter of the object.

14. The method according to claim 10, further comprising:

initially positioning the virtual camera behind the object in a starting object view, where the virtual camera position is located on a first axis of the first horizontal ellipse, and where the viewing direction points toward a location located on a first axis of the second horizontal ellipse.

15. The method according to claim 10, further comprising:

positioning the first horizontal ellipse and the second horizontal ellipse coaxially and parallel to each other, and where the point to which the viewing direction directs from the virtual camera position is located on a perimeter of the second horizontal ellipse.

16. The method according to claim 10, further comprising:

changing the virtual camera position vertically from a first height above the object to a second height above the object, where a perimeter of the second horizontal ellipse and a perimeter of the first horizontal ellipse are based on the second height above the object.

17. The method according to claim 10, further comprising:

changing the virtual camera position in a direction about a first ellipsoidally shaped body defined by a rotation of the first horizontal ellipse, where the viewing direction points towards a location on a second ellipsoidally shaped body defined by a rotation of the second horizontal ellipse.

18. A method performed by an image processing device, comprising:

generating a surround view based on image data, where the image data includes image data associated with surroundings of a vehicle;

projecting the surround view inversely onto a bowl-shaped projection surrounding the vehicle;

generating a virtual user view on a display via a virtual camera position and a viewing direction, where the virtual camera position is on a first horizontal ellipse parallel to the ground at a first height above the ground, and the viewing direction directs from the virtual camera position to a point located on a second horizontal ellipse parallel to the ground at a second height above the ground, where the second height is lower than the first height, where the second horizontal ellipse is smaller than the first horizontal ellipse, and where each of the first horizontal ellipse and the second horizontal ellipse is smaller than the bowl-shaped projection at associated respective vertical locations of the bowl-shaped projection and each of the first horizontal ellipse and the second horizontal ellipse extends around the object, wherein the virtual camera position and the viewing direction are determined based on the first and second horizontal ellipses, the method further comprising:

maintaining the virtual camera position; and changing the viewing direction by moving the point located on the second horizontal ellipse responsive to a command for a horizontal view change.

* * * * *